Patented July 27, 1937

2,088,036

UNITED STATES PATENT OFFICE 2,088,036

AIR DRYING UREA-FORMALDEHYDE COATING COMPOSITION

Sydney Leonard Morgan Saunders, London, England

No Drawing. Application April 17, 1935, Serial No. 16,756. In Great Britain March 8, 1935

2 Claims. (Cl. 134—26)

This invention relates to synthetic resin compositions containing urea-formaldehyde condensation products, particularly for use in the manufacture of lacquers and coating compositions.

It is one object of the invention to produce a stable solution of the resinous urea-formaldehyde product which will produce an insoluble film when air dried.

It has been proposed, inter alia, to prepare lacquers, coating compositions and the like by condensing urea and formaldehyde with each other whilst they are dissolved or suspended in a suitable organic solvent, by means of an acid catalyst.

This method has the disadvantage that unless a considerable excess of formaldehyde is used, e. g., 5 gram molecules of formaldehyde to one gram molecule of urea, unstable or insoluble products are formed.

Again it has been proposed to prepare lacquers, coating compositions and the like by condensing di-methylol urea, dissolved or suspended in a suitable organic solvent, substantially in the absence of water, with the aid of acid catalysts. The products so prepared are extremely susceptible to variation in the acidity of the final solutions and unless an extremely small amount of the acid catalyst is employed, unstable or insoluble products are obtained. Furthermore, the products obtained from monomethylol urea dissolved or suspended in organic solvents are even more susceptible to acid catalysts than those from di-methylol urea.

According to the present invention a process for preparing a synthetic resin composition suitable for incorporation into a coating composition comprises dissolving or suspending a methylol urea in an organic hydroxyl solvent in the substantial absence of water, adding sufficient anhydrous formaldehyde to bring the total (i. e. free and combined) formaldehyde into excess of that required for the formation of di-methylol urea and bringing about further reaction in the presence of an acid catalyst. The methylol urea may be mono- or di-methylol urea or a mixture thereof. The quantity of formaldehyde to be used is governed by the relative proportion of mono-methylol and di-methylol urea and also by the amount and activity of the catalyst. The greater proportion of catalyst added, the higher the proportion of formaldehyde required to control the reaction. Very vigorous catalysts also require substantially higher proportions of formaldehyde. Using a 10% solution of hydrochloric acid, however, in the proportion of about 0.05% of the methylol urea and assuming the methylol urea to be entirely in the form of mono-methylol urea, then the amount of formaldehyde in the form of paraformaldehyde required will be two parts by weight to three parts by weight of mono-methylol urea. The total formaldehyde, therefore, in comparison with the urea will be as 3 mols:1 mol. In contrast, catalysts of a mild nature such as phthalic acid require a smaller proportion, the total formaldehyde in comparison with urea being 2½ mol.:1 mol.

Accordingly the invention includes dissolving mono or dimethylol urea or mixtures thereof in an organic hydroxyl solvent (for example, ethylene glycol mono ethyl ether) in the substantial absence of water and adding sufficient formaldehyde to bring the total (combined and free) aldehyde to a ratio of 3 mols of formaldehyde to one mol. of urea and heating the mixture (for example, to a temperature of 100° C.) in the presence of about 0.05% of a 10% solution of hydrochloric acid.

A distinct advantage is shown over the method of condensing urea with a large excess of formaldehyde in the presence of an acid catalyst, in that the total amount of formaldehyde required by the proposed method is considerably less.

A further advantage is that air drying lacquers may be prepared in a stable form. In order to obtain an air drying lacquer from one which hardens only under heat, it is necessary to add an acid catalyst to the solution of urea formaldehyde condensation product. This causes a further action to take place with the result that on evaporation of the solvent, a film is obtained which is then insoluble in the solvent, or becomes so after a few hours. Unfortunately, the action also occurs in solution with the result that the lacquer gradually becomes a gel. Now according to the present discovery, the resinous product is so modified by its reaction with a portion of the formaldehyde employed, that the presence of the remainder prevents this continued reaction while in solution, or further modifies it in such a way that the lacquer remains perfectly stable, but on evaporation of the solvent together with the accompanying loss of formaldehyde, the reaction is allowed to occur, with the result that an insoluble film is produced.

The solvent used for dissolving or suspending the simple urea condensation product must be a volatile organic solvent containing at least one hydroxyl group, but those solvents are preferred which are least soluble in water, since the films produced from these solvents are themselves least affected by water.

The invention also includes the addition of resins at any stage during or after the condensation. The resins may be natural, in which case they may be recent or fossil, raw or processed; or artificial such as phenol formaldehyde resins, chlorinated diphenyl resins, or alkyd resins, but in all cases, they must be soluble in the solvent employed during the condensation.

The invention further includes lacquers, coating compositions and the like whenever prepared according to the processes outlined in the preceding paragraphs.

The following examples illustrate the nature of the invention, but do not restrict it in any way. The parts are by weight:—

Example 1

90 parts of mono-methylol urea are added to a solution of 60 parts paraformaldehyde in 150 parts of ethylene glycol mono-ethyl ether, 0.05% of dilute hydrochloric acid is added to the warm solution and the temperature kept at 100° C. for ½ hour. On cooling a fairly viscous lacquer is produced which air dries to an insoluble film in two hours.

Example 2

90 parts of mono-methylol urea are added to a solution of 45 parts of paraformaldehyde in 120 parts of butyl alcohol. 0.5 part of phthalic acid is added to the warm solution and the temperature kept at 100° C. for ½ hour. A viscous lacquer is produced, which will air dry to a hard film which gradually becomes insoluble or will stove in ½ hour at 100° C. to a hard insoluble film.

It will be understood that the mono- or di-methylol urea may be replaced by mono-methylol thiourea and/or di-methylol thiourea partly or entirely.

I claim:—

1. A process for preparing an air drying coating composition under anhydrous conditions which comprises adding mono methylol urea to a volatile monohydric alcohol solvent containing in solution sufficient anhydrous formaldehyde to bring the total of the free and combined formaldehyde to a ratio of 3 mols of formaldehyde to 1 mol. of urea, and adding .05% of a 10% of hydrochloric acid calculated on the quantity used of mono methylol urea, and maintaining the temperature at 100° C. for ½ hour.

2. A process for preparing an air drying coating composition under anhydrous conditions which comprises adding 90 parts of mono methylol urea to a solution of 45 parts of paraformaldehyde and 120 parts of butyl alcohol adding ½ part of phthalic acid and maintaining the temperature at 100° C. for ½ hour.

SYDNEY LEONARD MORGAN SAUNDERS.